(United States Patent — Mohr)

United States Patent [19]
Mohr

[11] Patent Number: 4,591,656
[45] Date of Patent: May 27, 1986

[54] ACTIVATION KITS FOR PRE-SETS

[75] Inventor: Gregory L. Mohr, Mineral Wells, W. Va.

[73] Assignee: Butler Manufacturing Company, Kansas City, Mo.

[21] Appl. No.: 499,228

[22] Filed: May 31, 1983

[51] Int. Cl.⁴ .............................................. H02G 3/12
[52] U.S. Cl. ........................................ 174/48; 174/57
[58] Field of Search ............. 174/48, 49, 57; 52/221; 220/3, 7

[56] References Cited

U.S. PATENT DOCUMENTS

| | | | |
|---|---|---|---|
| 2,886,630 | 5/1959 | Gill | 174/57 |
| 3,303,264 | 2/1967 | Saul et al. | 52/221 X |
| 3,932,696 | 1/1976 | Fork et al. | 174/48 |
| 4,054,222 | 10/1977 | Suk | 174/66 X |
| 4,209,660 | 6/1980 | Flachbarth et al. | 174/48 |
| 4,289,921 | 9/1981 | Gartner et al. | 174/48 |
| 4,408,090 | 10/1983 | Kohaut | 174/48 |
| 4,443,654 | 4/1984 | Flachbarth et al. | 174/48 |
| 4,465,897 | 8/1984 | Albrecht | 174/48 |

FOREIGN PATENT DOCUMENTS 1699 of 1911 United Kingdom .................. 174/57

Primary Examiner—A. T. Grimley
Assistant Examiner—D. A. Tone
Attorney, Agent, or Firm—Frederick J. Olsson

[57] ABSTRACT

The kit includes, for a flush receptacle, an adjusting ring on the pre-set and a snap-in, removable access hatch and a carpet ring both on the adjusting ring. The hatch provides access to the pre-set for bringing out communication conductors. The carpet ring carries flush receptacle means which are accessed via flip lids. The carpet ring has a downwardly extending barrier telescoped into a divider in the pre-set to isolate the power conductors. The communication cables are brought out through centrally located knock-outs in the access hatch and the cut edges of the carpet adjacent the knock-outs are protected by an overhanging shield on the carpet ring. The kit, for one or two receptacles mounted within the pre-set, includes an adjusting ring, a pair of access hatches, and a pair of receptacle plates.

8 Claims, 15 Drawing Figures

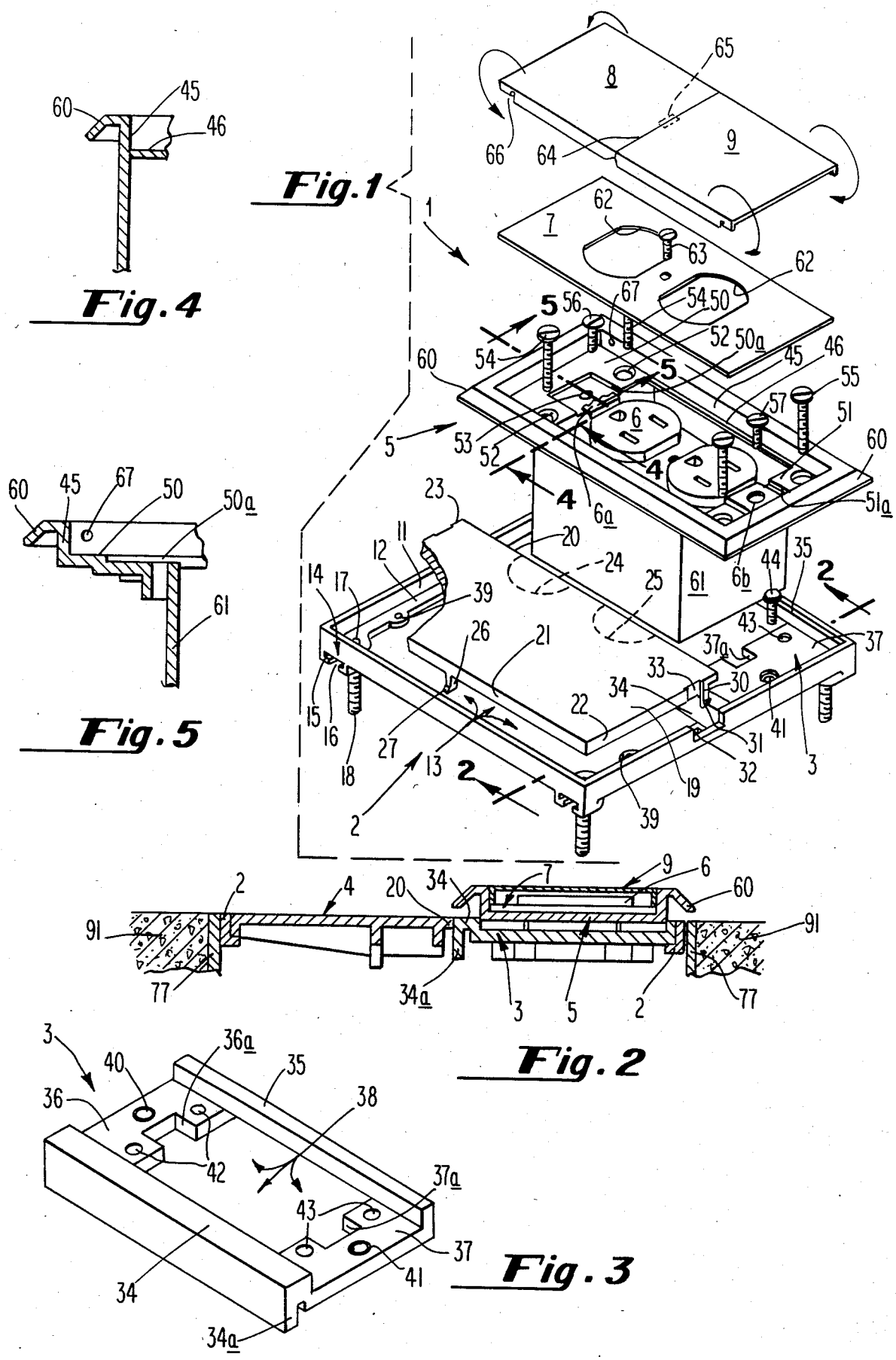

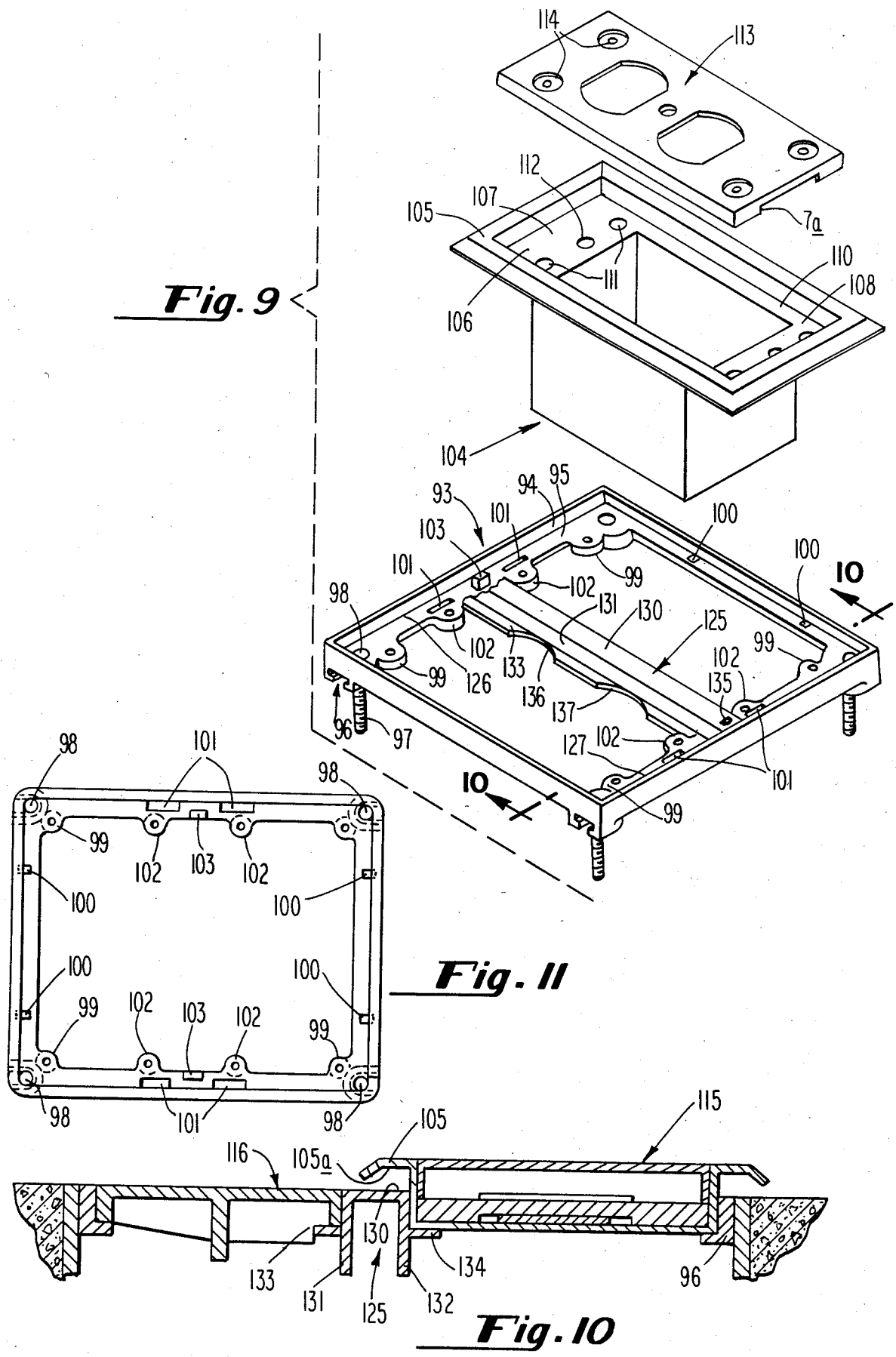

ACTIVATION KITS FOR PRE-SETS

The invention relates in general to electrical underfloor systems for buildings and more specifically relates to activation kits for pre-set access units used with cellular raceways in building floors.

The activation kits of the invention have particular utility in connection with the pre-sets disclosed and claimed in my copending application Ser. No. 474,696 filed Mar. 11, 1983 and entitled MULTI-SERVICE PRESET ACCESS UNIT FOR CELLULAR RACEWAY and assigned to the assignee of this invention.

The principle objective of the invention is to promote the useful art of electrical underfloor systems by means of design for activation kits adaptable for both multi-service and either for flush or below-the-surface power receptacles, such design being characterized by an improved adjusting ring, an improved carpet ring, and an improved access hatch.

In the dual service, flush receptacle arrangement, the access hatch and carpet ring are set up side-by-side on an adjusting ring in the pre-set opening. The carpet ring carries a flush receptacle which is accessable via pivotal flip lids on the carpet ring. The access hatch can be lifted out to provide access to the communication cable in the pre-set without disturbing the carpet ring or the flip lids. The access hatch has inboard knockouts to lead out the communication cable with the knock-outs being located adjacent the carpet ring so that the cut edges of the carpet are protected by an edge shield on the ring.

Further in the dual service, flush receptacle arrangement, the carpet ring has a barrier which telescopes into a socket formed by a removable divider in the pre-set to isolate the power conductors, the telescoping arrangement permitting leveling adjustments without affecting the isolation function.

In the single or dual service arrangement where the receptacle is located within the pre-set, the kit is highly simplified in that it comprises the adjusting ring and a pair of access hatches with the power and/or communication cables being brought out through knock-outs.

The use of an access hatch and carpet ring in the adjusting ring or alternatively the use of a pair of access hatches provides that an in-use unit of one type can be easily converted to another type.

The adjusting ring is of special significance in that it has a unique arrangement for mounting the adjusting screws and for supporting the access hatch and/or carpet ring.

The activation kits will be described below in connection with the following drawing wherein:

FIG. 1 is an exploded, perspective view of parts of an activation kit for a dual service, flush receptacle arrangement;

FIG. 2 is a sectional view of the parts of FIG. 1 assembled together, the view, under such condition, being taken on the lines 2—2 of FIG. 1;

FIG. 3 is a perspective view of a support bracket used in the kit of FIG. 1;

FIG. 4 is a fragmentary sectional view taken as indicated by the line 4 on FIG. 1;

FIG. 5 is a fragmentary sectional view taken as indicated by the line 5 on FIG. 1;

FIG. 9 is an exploded perspective view of parts of a modified activation kit for a dual service flush receptacle arrangement;

FIG. 10 is a sectional view of a kit of the kind of FIG. 9 assembled together, the view, under such condition, being taken along the lines 10—10 of FIG. 9;

FIG. 11 is a plan top view of the adjusting ring of FIG. 9;

Figure 7:
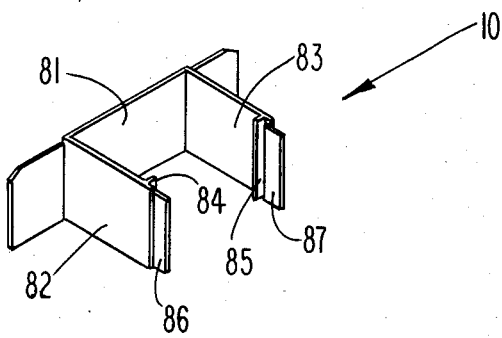
FIG. 7 is a perspective view of a divider used in the pre-set of FIG. 6 to isolate the power and communication compartments.

In FIG. 1 the activation kit 1 includes adjusting ring 2, support bracket 3 (see also FIG. 3), an access hatch 4, carpet ring 5, receptacle means 6, receptacle plate 7, and a pair of flip lids 8 and 9. The kit also includes the divider 10 shown in FIG. 7. The adjusting ring 2 is rectangular in shape and has a peripheral, vertically extending flange 11 and an inner support flange 12 extending inwardly from the bottom of the flange 11. The inner edge of the flange 12 forms ring opening 13.

At the bottom of each of the four corners of the adjusting ring are thickened sections in which are formed adjusting screw retaining slots. All the slots are identical so only the slot at one corner need be described. Thus, the slot indicated at 14 has a horizontally extending section 15 and a vertically extending section 16. Both sections are open to the periphery of the ring. The support flange 12 has hole 17 which is in communication with the horizontal slot section 15. It will be evident that the head and threads of an adjusting screw outside of the ring (such as screw 18) can be respectively inserted into the slot sections 15 and 16. The head of the screw and the depth of slot 15 are such that when the screw is fully in the slot, the head is aligned with the hole 17. A tool inserted through the hole 17 can be used to turn the adjusting screw.

The access hatch 4 is generally rectangular in shape and is adapted to sit adjacent the carpet ring 5 in the adjusting ring 2. The hatch has a top planar surface 19, an inner edge 20, an outer edge 21, and side edges 22 and 23. Adjacent the inner edge 20 are a pair of knockouts 24 and 25. The hatch rests on the support flange 12 where it is removably held in position by locking and flexible fingers. At the outer edge 21 there is a locking finger 26 with a locking head 27 at its lower end. Each of the side edges 22 and 23 has a flexible keeper finger, the finger for the edges 22 being indicated at 30. The finger 30 extends downwardly and has keeper head 31 at its lower end.

The support flange 12 is provided with slots to receive the fingers as the hatch is mounted on the support flange 12, one of such slots is indicated at 32 for the finger 30. When the hatch is on the support flange and each finger is in its slot, the locking and keeper heads are underneath and engaging the bottom of the vertical flange.

To install a hatch, the same is tilted so that the locking finger 26 is in its slot and then the portion adjacent the inner edge 20 is pressed down so that the keeper fingers 30 go into place. The hatch is removed by prying the same off. This is done by inserting a screwdriver tip in one of the pry slots 33.

The underside of the hatch 4 has certain structural features which will be noted later.

The support bracket 3 has a pair of parallel ribs 34 and 35 and end sections 36 and 37 forming a central opening 38. The end sections 36 and 37 have countersunk clearance holes 40 and 41 together with pairs of threaded holes 42 and 43. The end sections 36 and 37 are thickened to provide the material for the above mentioned threads. As will be observed the rib 34 has a vertically extending section 34a to provide for additional strength.

The support bracket is nested in the adjusting ring with the end sections 36 and 37 and the rib 35 on the support flange 12. The support flange 12 has two pair of threaded retainer tabs, one pair being noted at 39. The other corresponding pair of threaded retaining tabs occupy an identical position on the opposite side of the ring. Thus, when the support bracket is in position, the countersunk clearance holes 40 and 41 in the bracket are aligned with the threaded holes in the retainer tabs. A pair of screws in the countersunk clearance holes secure the bracket to the adjusting ring. One of such screws is indicated at 44.

The relative positions of the support bracket 3 and the access hatch 4 are noted in FIG. 2 where it will be seen that the inner edge 20 of the hatch abuts the rib 34 of the support bracket. The carpet ring 5 is generally rectangular in shape and has vertically extending flange 45 and a support flange 46 on the bottom of the vertical flange and extending inwardly therefrom. The support flange 46 includes the receptacle support portions 50 and 51.

The receptacle support portions have undercuts 50a and 51a and each has a pair of counterbore clearance holes and a center threaded hole. For the support portion 50 the counterbore clearance holes are indicated at 52 and the center threaded hole at 53. When the carpet ring is in position the counterbore clearance holes 52 are aligned with the threaded holes 42 in the support bracket to receive screws 54 for holding the carpet ring on the support bracket. The support portion 51 has similar holes and the carpet ring is held by screws 55.

The receptacle 6 has tangs 6a and 6b which fit into the cutouts 50a and 51a. Screws through the tangs and in the threaded holes of the cutouts hold the receptacle in position. Thus, the tang 6a has a countersunk clearance hole (not shown) aligned with center hole 53 and is held by the screw 56. The tang 6b is similarly held by screw 57.

The carpet ring has a protective carpet edge shield in the form of a flange 60 which is formed in the top of the vertical flange 45 and extends outward and downwardly therefrom. The carpet ring also has a downwardly extending barrier 61. The barrier is formed partially on the vertical flange 45 (FIG. 4) and partially on the receptacle support portions (FIG. 5). The barrier is adapted to slide into a socket formed in the divider 10 inside the pre-set.

The receptacle plate 7 fits down on the carpet ring flange 46 and has apertures 62 to receive the plug-in sections of the receptacle. The plate 7 is held down by screw 63.

The flip lids 8 and 9 are of identical construction. The lids are pivotally connected to the carpet ring and are movable between a horizontal or down position (as shown) to an open position approximately 90° away. In the closed position, the receptacle plug-in means are covered, and in the open position are uncovered. Either lid can be pried up by inserting the tip of a screwdriver between the abutting edge 64 into the undercut on a lid. The undercuts are indicated at 65.

Each pivot means comprises a pair of opposite dimples on the vertical wall 45 receiving a pair of bosses on opposite sides of a lid. For the lid 8, one of the bosses is indicated at 66. A dimple on wall 45 is indicated at 67. Each lid has a generally C-shaped cross section with the top surface being planar and flush with the carpet shield 60 as noted in FIG. 2.

As previously mentioned, the activation kit of FIG. 1 is particularly adapted to be mounted on a pre-set of the kind disclosed and claimed in my copending application Ser. No. 474,696 which are used on both field assembled and factory assembled cellular raceways.

Figure 6:
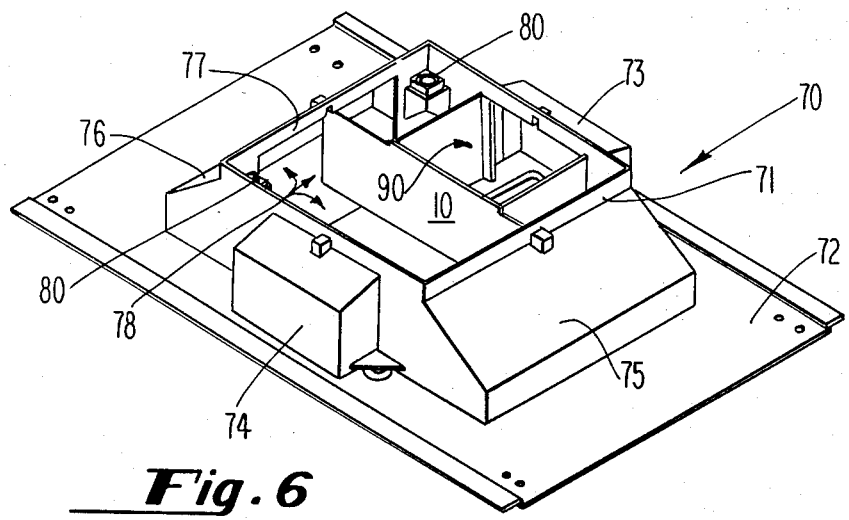
FIG. 6 is a perspective view of a typical pre-set with which the kit of FIG. 1 may be used.

With field assembled raceways, the power and communications cells are formed in the field as by covers installed over adjacent corrugations of the decking. In such cases, the pre-set must be provided with a base. Thus, the pre-set as illustrated in FIG. 6 has a housing 71 and a base 72. With factory assembled raceways, for example, three adjoining cells or three spaced apart cells, it is not necessary that the pre-set include a base since the housing may be set down directly on the top of the cells. When the top of the cellular raceway is not essentially flat, for example in spaced apart cells, sides of the pre-set have concrete-blocking extensions.

With the above in mind, I will now comment on the procedure which may be conveniently used to install the kit on a pre-set.

The pre-set 70 has power sections 73 and 74, and communication sections 75 and 76. The top 77 of the housing forms a generally horizontally extending top opening 78. At each corner of the housing in the top opening 78 are nut means, two of which are indicated at 80.

As explained in my co-pending application Ser. No. 447,696, the pre-set, after the pour is set, can be accessed by removing a mud cap from the opening 78. For the description which immediately follows, assume that the concrete has been poured and hardened and the mud cap removed. This relationship is noted in FIG. 2 when the top 77 is flush with the top surface of the concrete 91.

First, the power conductors or cables in the power section are brought up and outside of the top opening 78.

Next, the divider 10 is mounted on the base 72. Where the pre-set is of the kind without a base, the pre-set is mounted on the top of the power cell in the cellular raceway. In either case, the divider extends upwardly toward the top opening 78.

The divider is preferably made from LEXAN plastic to achieve flexibility for insertion or removal through the top opening 78. The divider has a main wall 81 and two parallel sub-walls 82 and 83. The ends of the sub-walls have inwardly extending abutments 84 and 85 and off-sets 86 and 87.

The divider 10 is put in position by turning 45° (from the position of FIG. 6), placing down on the base (or top of power cell), turning back 45°, and then moving the divider until the ends of the sub walls 82 and 83 engage the pre-set wall as shown. The off-sets 86 and 87 serve to guide the divider into position. The main wall 81 and sub walls 82 and 83 isolate the power compartment 73 from the communication compartments 75 and 76. The walls 81, 82, 83, and abutments 84 and 85 form a socket 90 which is dimensioned to slidingly receive the barrier 61 on the carpet ring 5. The abutments particularly serve to prevent the divider from being moved away from the barrier after the latter is in position.

The adjusting ring 2 is now provided with adjusting screws and the screws then set up on the nut means 80 and then turned to bring the top of the vertical flange 11 flush with the surface of the concrete and access unit having top 77.

The power conductors are now fished through the support bracket 4 and the bracket secured to the adjusting ring by the screws 44. The power conductors are fished through the carpet ring.

The carpet ring then can be moved down on the adjusting ring with the barrier 61 sliding into the socket 90 and with the carpet ring on the support bracket where it is secured by the screws 54 and 55. The receptacle is wired, placed on the carpet ring and secured by screws 56 and 57. The receptacle plate 7 placed down over the receptacle and secured by screw 63. The flip lids put in position by squeezing the same laterally so that the bosses 66 slide down and into dimples 67. The access hatch 4 is now placed in position as previously described.

The hatch provides access to the interior of the pre-set and the communication compartments 75 and 76 which may have telephone or data conductors. As previously mentioned, the communication conductors or cables are brought out via the knock-outs 24 and/or 25 in the hatch. The details of knock-out formation will be noted later.

Figure 8:
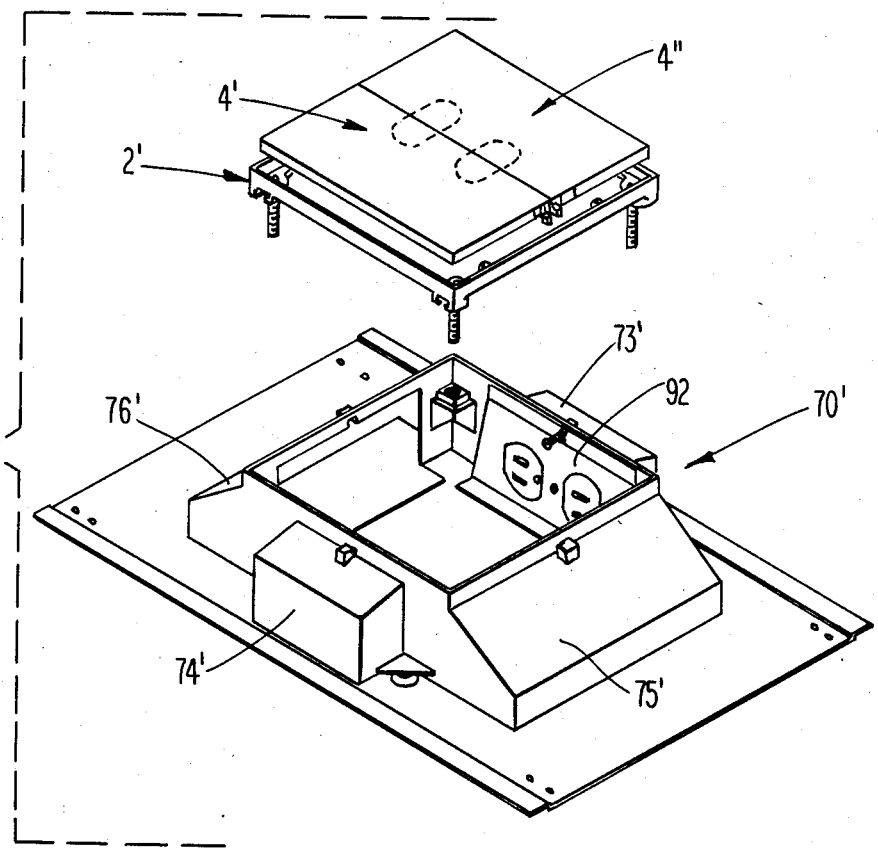
FIG. 8 is an exploded perspective view of an activation kit for a dual service inside receptacle arrangement, the pre-set being the same as in FIG. 6 except it has an inside receptacle.
Figure 12:
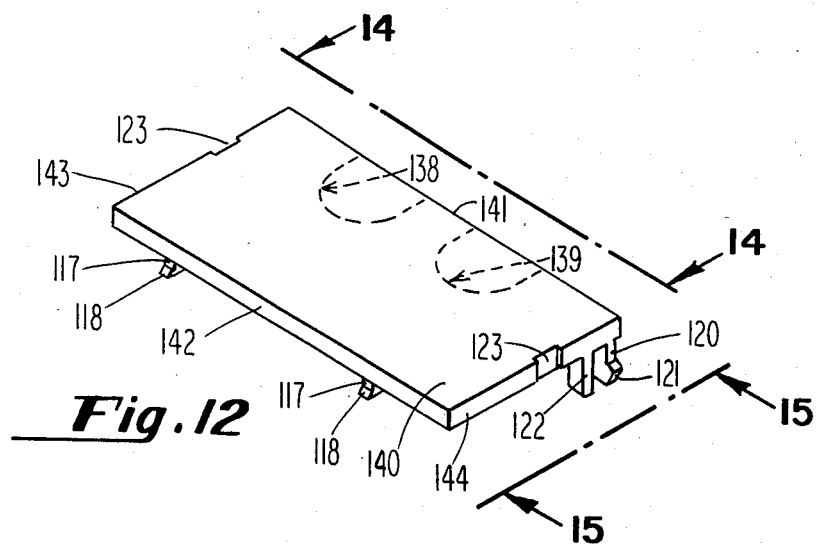
FIG. 12 is a perspective view of a modified access hatch.

The adjusting ring 2 and a pair of the access hatches 4 of FIG. 1 are employed in a kit for a pre-set having an inside receptacle. Such an arrangement is shown in FIG. 8 where corresponding numbers with a prime mark are used to identify the parts. The pre-set 70' has a receptacle 92 in the power compartment 73'. The power compartment 74' also may have a receptacle. One or both of the communication compartments 75' and 76' may be activated. The adjusting ring 2' is mounted in the pre-set and the hatches 4' and 4" are mounted on the ring as previously described.

Before turning to the embodiment of FIG. 9, it is pointed out that socket 90 slidingly receiving the barrier 61 permits a wide range of vertical positions for the carpet ring without disturbing the isolation function. Further, it is to be noted that when the ends of the main wall 81 are in the communication sections and the off-sets 86 and 87 are in the power sections, the same engage the tops of these sections and this prevents any disturbance of the divider due to vertical movement of the barrier as the adjusting ring is adjusted.

In FIG. 9, I have illustrated certain parts of a simplified activation kit.

The adjusting ring 93 has a vertical flange 94, a horizontal flange 95, adjusting screw slots 96 having adjusting screws 97, access holes 98 in the horizontal flange 95, threaded bosses 99, locking slots 100 and keeper/-guide slots 101. The foregoing parts are similar to the corresponding parts in the adjusting ring 2 except that the slots 101 are wider than slots 32 for reasons noted later.

The adjusting ring 93 is modified by that it has additional threaded bosses 102 and upstanding divider posts 103, the purposes of which are noted later.

The carpet ring 104 is similar to the carpet ring 5 except that the horizontal flange 106 has been modified as follows. In the receptacle support portions 107 and 108 the receptacle cutouts have been eliminated and on the long sides the width of the flange has been slightly increased as noted at 110. Further, the holes 111 are not counterbored. The receptacle tang attaching holes 112 are the same as the corresponding holes 53.

The receptacle plate 113 has been changed as respects the receptacle plate 7 by that it is thicker and has cutouts 7a on the underside to accomodate the receptacle. Also, the receptacle plate has counterbore holes 114. The holes 114, 111, and the threaded holes in the bosses 99 and 102 are in position to accept hold-down screws, the heads of which bear on the receptacle plate.

The assembly of FIG. 9 employs the same kind of flip lids as in FIG. 1. One of these lids is indicated at 115 in FIG. 10.

The access hatch 116 employed with the assembly of FIG. 9 is the same as the access hatch 4 except that instead of one locking finger a pair of locking fingers 117 (each having a locking head 118) are used. Also, adjacent each flexible keeper finger 120 (each with keeper head 121), there is a shield post 122. The pry-slots 123 have been located to accomodate the shield posts. Also, to be noted, the keeper/guide slots 101 have been made wide enough to accomodate the fingers 120 and shields 122.

The purpose of each shield post is to protect its flexible fingers from being snapped off by contact with the adjusting ring in that when the hatch is pushed down, the stronger shields are more likely to contact the side of the adjusting ring if the alignment of the hatch is not correct and cause the same to shift so the fingers go into the slots.

With respect to the locking heads 27 and 118, each is chisel shaped so as to enhance positioning the same under the vertical flange. Also, the keeper heads 31 of the flexible fingers 30 and the keeper heads 121 of fingers 120 are each wedge shaped with intersecting upper and lower surfaces. The lower surface is oriented at 30° to the vertical while the upper surface is oriented at 60° to the vertical. The orientation of the lower surfaces will allow the fingers to easily slide into the slots and the orientation of the upper surfaces makes it more difficult for the fingers to slide out. This acts as a safeguard against impacts on the hatch causing the same to become loose. The underside structure of the access hatch will be commented on later.

The assembly of FIG. 9 includes an additional member which functions to provide center support for the carpet ring and the access hatch. This member is a support divider bracket 125 which is centrally located in the adjusting ring and extends between the sides 126 and 127 of the adjusting ring where it rests on the horizontal flange 95. The cross sectional shape of the divider is shown in FIG. 10.

The divider has a flat top 130 and a pair of downwardly extending sides 131 and 132. The sides 131 and 132 respectively have support arms 133 and 134. At opposite ends of the top 130 are cavities one of which is noted at 135. The cavities respectively receive the divider posts 103. The cavities and posts are dimensioned so as to provide for a press-fit.

As noted in FIG. 10, the support arms 133 and 134 provide inside support for the access hatch and for the carpet ring.

The arms 133 and 134 have semi-circular slots 136 and 137 which are vertically aligned with the knockouts 138 and 139 in the access hatch.

Figure 13:
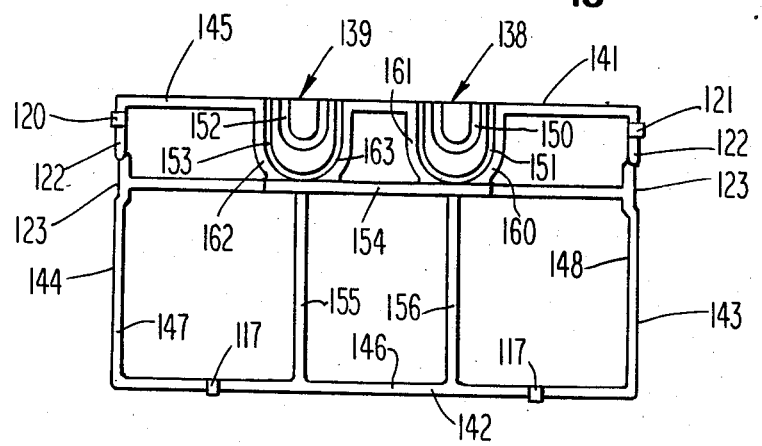
FIG. 13 is a bottom view of the access hatch of FIG. 12.

I will now comment on the underside structure of the access hatch. This structure provides the necessary supporting strength. Like the hatch 4, the hatch 116 comprises a plate which is rectangular in shape and has a planar top surface 140 and inner edge 141 and outer edge 142 and side edges 143 and 144. On the underside (FIG. 13) and extending around the periphery of the hatch is a rib means which is comprised of inner rib section 145, outer rib section 146, and side rib sections 147 and 148.

Figure 14:
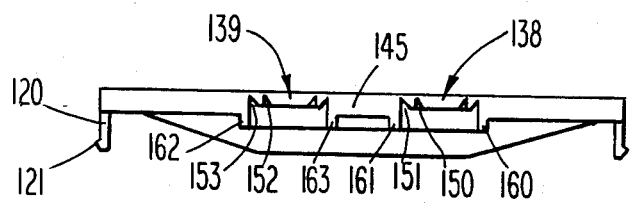
FIG. 14 is a side view of the hatch of FIG. 12 looking from the side 14—14.
Figure 15:
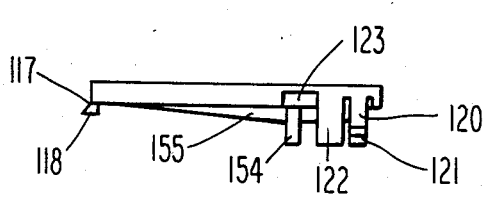
FIG. 15 is an end view of the hatch of FIG. 12 looking from the end 15—15 of FIG. 12.

The knockout 138 is formed by U-shaped inner cut-out 150 and concentric outer cut-out 151, the ends of the legs of the U of each cut-out terminate in the inner rib section 145 which has somewhat decreased thickness (FIG. 14) at the cut-out area. Knock-out 139 is formed by U-shaped inner cut-out 152 and concentric outer cut-out 153, the ends of which terminate in the inner rib section 145. The cut-outs are chisel shaped.

The inner and outer cut-outs provide that the material within the confines of the same can be broken away. Thus, each of the cut-outs 138 and 139 can be of two sizes depending on the material removed.

A main rib 154 extends downwardly from the plate and is parallel to the inner and outer rib sections 145 and 146 and is connected to the side rib sections 147 and 148. As noted, the main rib is closely adjacent the outer cut-outs 151 and 153.

A pair of cross ribs 155 and 156 extend down from the bottom of the plate and are connected between the main rib 154 and outer rib section 146. The cross ribs are respectively aligned with the knockouts.

For the knockout 138, a pair of knockout ribs 160 and 161 extend down from the plate and are connected to the inner rib section 145 and to the main rib 154. The ribs are closely adjacent the outer cut-out 151. For the knockout 139, a pair of knockout ribs 162 and 163 are arranged around the cut-out 153.

The access hatch 4 has the same kind of inner, outer, and side rib sections together with main cross and knockout ribs as just described.

In the embodiment of FIG. 9, the adjusting ring 93, the carpet ring 104, and the access hatch 116 are dimensioned to accomodate the divider 125. When a pair of hatches are used in a kit for an inside receptacle (like FIG. 8), the hatches will be separated by the divider. The top surface 140 of each hatch is coplanar with the top surface 130 of the divider.

As noted in FIG. 10, I have reduced the thickness of the portion 150a of the protective flange 105 which extends over the divider 125. This reduction in thickness, which retains its protective function, makes it easier to pull the carpet from under the flange and expose the access hatch when the same is to be removed. Also, with relation to FIG. 11, it is pointed out that the bosses 99 and 102 can be eliminated from one side of the carpet ring (say the left side) so that only the right hand side can be used for the carpet ring 104.

Before closing, it is pointed out that the various threaded holes mentioned heretofore may be non-threaded and arranged to receive self-tapping screws.

I claim:

1. An activation kit in combination with an under-floor pre-set unit, the pre-set having a top opening and nut means in the top opening, the activation kit comprising:
    an annular adjusting ring disposed in said top opening and having a vertically extending flange and a support flange connected thereto and extending horizontally inwardly therefrom and forming a ring opening;
    means on said ring forming a plurality of adjusting screw retaining slots, each slot comprised of a horizontally extending section and a vertically extending section and each section being open to the periphery of the ring whereby, when the ring is free from the pre-set, the head of an adjusting screw can be moved into the horizontal section and the threads thereof move into the vertical section from a point exterior to the ring;
    a plurality of adjusting screws respectively disposed in said slots with the heads in the horizontal sections and threads in the vertical sections, the threads of the screws being respectively threaded into said nuts;
    a plurality of holes formed in said support flange respectively in communication with said horizontal sections and providing access to the head of an adjusting screw in a horizontal section for turning the same to vertically move the adjusting ring relative to the pre-set unit;
    at least one snap-in access hatch mounted on said support flange and being dimensioned to partially cover said ring opening, the hatch having:
        (a) an inner edge extending across said ring opening and an outer edge adjacent said vertically extending flange;
        (b) a pair of downwardly extending flexible keeper fingers disposed adjacent opposite ends of said inner edge, each finger having keeper means adjacent its lower end;
        (c) at least one downwardly extending locking finger disposed on said outer edge and having retainer means adjacent its lower end;
        (d) means adjacent said inner edge forming a plurality of knock-outs; and
    a plurality of slots formed on the support flange respectively receiving said fingers whereby said keeper means and said retainer means are underneath and in engagement with said vertical flange.

2. An activation kit in combination with an under-floor pre-set unit, the pre-set having at least one power compartment, and at least one communications compartment, a horizontally extending top opening, and a plurality of nut means in the top opening, the kit comprising:
    an annular adjusting ring in said top opening and having a plurality of adjusting screws threaded into said nut means;
    a divider mounted inside of said pre-set and having a vertical wall extending upwardly toward said top opening and configured to form a socket surrounding said power compartment and isolating the same from said communications compartment;
    an annular carpet ring mounted on said adjusting ring having a vertically extending flange, a support flange formed on the bottom of the vertical flange and extending horizontally inwardly therefrom and including receptacle support portions, a carpet edge shield formed on the top of the vertical flange and extending outwardly and downwardly therefrom, a barrier formed partially on the bottom of the vertical flange and partially on said receptacle support portions and extending respectively downwardly therefrom into said socket;

power receptacle means mounted on said receptacle support portions;

receptacle plate disposed on said receptacle means; and a pair of flip lids disposed over said receptacle plate and for each flip lid, pivot means between the lid and vertical flange and providing for each lid to be moved between a closed position where the lid covers part of said receptacle means and an open position where the lid uncovers said receptacle part to provide access to the receptacle part.

3. An activation kit in combination with an underfloor pre-set unit, the pre-set having at least one power compartment, a horizontally extending top opening, and a plurality of nut means in the top opening, the kit comprising:

an annular adjusting ring disposed in said top opening and having a vertically extending flange and a support flange connected thereto and extending horizontally inwardly therefrom and forming a ring opening;

means on said ring forming a plurality of adjusting screw retaining slots, each slot comprised of a horizontally extending section and a vertically extending section and each section being open to the periphery of the ring whereby, when the ring is free from the pre-set, the head of an adjusting screw can be moved into the horizontal section and the threads thereof move into the vertical section from a point exterior to the ring;

a plurality of adjusting screws respectively disposed in said slots with the heads in the horizontal sections and threads in the vertical sections, the threads of the screws being respectively threaded into the nuts;

a plurality of holes formed in said support flange respectively in communication with said horizontal sections and providing access to the head of the adjusting screw in a horizontal section for turning the same to vertically move the adjusting ring relative to the pre-set unit;

a pair of snap-in access hatches mounted on said support flange and each covering substantially one-half of said ring opening, each hatch having:
 (a) an inner edge extending across said ring opening and an outer edge adjacent said vertically extending flange;
 (b) a pair of downwardly extending flexible keeper fingers disposed adjacent opposite ends of said inner edge, each finger having keeper means adjacent its lower end;
 (c) at least one downwardly extending lock finger disposed on said outer edge and having retainer means adjacent its lower end;
 (d) means adjacent said inner edge forming a plurality of knock-outs; and a plurality of slots formed on the support flange respectively receiving said fingers whereby said keeper means and said retainer means are underneath and in engagement with said vertical flange.

4. An activation kit in combination with an underfloor pre-set unit, the pre-set having a base, at least one power compartment and at least one communications compartment adjacent the base, a horizontally extending top opening above the base, and a plurality of nut means in the top opening, the kit comprising:

a rectangular shaped adjusting ring disposed in said top opening and having a vertically extending flange and a support flange connected thereto and extending horizontally inwardly therefrom and forming a ring opening;

means on said ring forming a plurality of adjusting screw retaining slots, each slot comprised of a horizontally extending section and a vertically extending section and each section being open to the periphery of the ring whereby, when the ring is free from the preset, the head of an adjusting screw can be moved into the horizontal section and the threads thereof move into the vertical section from a point exterior to the ring;

a plurality of adjusting screws respectively disposed in said slots with the heads in the horizontal sections and threads in the vertical sections, the threads of the screws being respectively threaded into said nuts;

a plurality of holes formed in said support flange respectively in communication with said horizontal sections and providing access to the head of an adjusting screw in a horizontal section for turning the same to vertically move the adjusting ring relative to the pre-set unit;

a snap-in access hatch mounted on said support flange, the hatch having:
 (a) an inner edge extending across said ring opening and an outer edge adjacent said vertically extending flange;
 (b) a pair of downwardly extending flexible keeper fingers disposed adjacent opposite ends of said inner edge, each finger having a keeper means adjacent its lower end;
 (c) at least one downwardly extending locking finger disposed on said outer edge and having retainer means adjacent its lower end;
 (d) means adjacent said inner edge forming a plurality of knock-outs;

a plurality of slots formed on the support flange respectively receiving said fingers whereby said keeper means and said retainer means are underneath and in engagement with said vertical flange;

a divider mounted on said base and having a vertical wall extending upwardly toward said top opening and configured to form a socket surrounding said power compartment and isolating the same from said communications compartment;

a support bracket mounted on said support flange and having a flange abutting the inner edge of said access hatch, the support bracket having a central opening;

a rectangular shaped carpet ring mounted on said support bracket and having a vertically extending flange, a support flange formed on the bottom of the vertical flange and extending horizontally inwardly therefrom and including receptacle support portions, a carpet edge shield formed on the top of the vertical flange and extending outwardly and downwardly therefrom, a barrier partially formed on the bottom of the vertical flange and partially on said receptacle support portions and extending respectively downwardly therefrom into said socket;

power receptacle means mounted on said receptacle support portions;

a receptacle plate disposed on said receptacle means; and a pair of flip lids disposed over said receptacle plate and for each flip lid, pivot means between the lid and vertical flange and providing for each lid to be moved between a closed position where the lid covers part of said receptacle means and an open position where the lid uncovers said receptacle part to provide access to the receptacle part.

5. An activation kit in combination with an underfloor pre-set unit, the pre-set having at least one power compartment and at least one communications compartment, a horizontally extending top opening, and a plurality of nut means in the top opening, the kit comprising:

a rectangular shaped adjusting ring disposed in said top opening and having a vertically extending flange and a support flange connected thereto and extending horizontally inwardly therefrom and forming a ring opening;

means on said ring forming a plurality of adjusting screw retaining slots, each slot comprised of a horizontally extending section and a vertically extending section and each section being open to the periphery of the ring whereby, when the ring is free from the pre-set, the head of an adjusting screw can be moved into the horizontal section and the threads thereof move into the vertical section from a point exterior to the ring;

a plurality of adjusting screws respectively disposed in said slots with the heads in the horizontal sections and threads in the vertical sections, the threads of the screws being respectively threaded into said nuts;

a plurality of holes formed in said support flange respectively in communication with said horizontal sections and providing access to the head of an adjusting screw in a horizontal section for turning the same to vertically move the adjusting ring relative to the pre-set unit;

an elongated support divider extending between a pair of oppositely disposed support flanges and connected thereto, the divider having a pair of support arm respectively on opposite sides thereof;

a snap-in access hatch mounted on said support flange, the hatch having:

(a) an inner edge extending across said ring opening and an outer edge adjacent said vertically extending flange, the inner edge engaging and being supported on one of said divider support arms;

(b) a pair of downwardly extending flexible keeper fingers disposed adjacent opposite ends of said inner edge, each finger having a keeper means adjacent its lower end;

(c) at least one downwardly extending locking finger disposed on said outer edge and having retainer means adjacent its lower end;

(d) means adjacent said inner edge forming a plurality of knock-outs; and a plurality of slots formed on the support flange respectively receiving said fingers whereby said keeper means and said retainer means are underneath and in engagement with said vertical flange;

a divider mounted inside of said pre-set and having a vertical wall extending upwardly toward said top opening and configured to form a socket surrounding said power compartment and isolating the same from said communications compartment;

a rectangular shaped carpet ring mounted on said support flange and on the other of said divider support arms and having a vertically extending flange, a support flange formed on the bottom of the vertical flange and extending inwardly therefrom and including receptacle support means, a carpet edge shield formed on the top of the vertical flange and extending outwardly and downwardly therefrom, a barrier formed partially on the bottom of the vertical flange and partially on said receptacle support portions and extending respectively downwardly therefrom into said socket;

power receptacle means mounted on said receptacle support portions;

a receptacle plate disposed on said receptacle means; and a pair of flip lids disposed over said receptacle plate and for each flip lid, pivot means between the lid and vertical flange and providing for each lid to be moved between a closed position where the lid covers part of said receptacle means and an open position where the lid uncovers said receptacle part to provide access to the receptacle part.

6. An adjusting ring for an underfloor device comprising:

an annular body having a vertically extending flange and a support flange connected thereto and extending horizontally inwardly therefrom and forming a ring opening;

a plurality of access openings formed in and extending through said support flange;

means on said body forming a plurality of retaining slots, each slot comprised of a horizontally extending section and a vertically extending section and each section being open to the periphery of the ring whereby the head of an adjusting screw can be moved into the horizontal section and the threads thereof moved into the vertical section from a point exterior to the ring; and each said horizontal section being configured to retain the head of adjusting screw therein in a position aligned with one of said access openings.

7. An adjusting ring and support divider for an underfloor device comprising:

a rectangular shaped, four-sided body having a vertically extending flange and a support flange connected thereto and extending horizontally inwardly therefrom and forming a ring opening;

means on said body forming a plurality of adjusting screw retaining slots, each slot comprised of a horizontally extending section and a vertically extending section and each section being open to the periphery of the ring whereby the head of an adjusting screw can be moved into the horizontal section and the threads thereof move into the vertical section from a point exterior to the ring;

a first pair of keeper slots formed on the support flange on a first side of the body for receiving flexible keeper fingers;

a second pair of keeper slots formed on the support flange on a second side of the body opposite said first side for receiving flexible keeper fingers;

a first pair of retainer/guide slots formed on the support flange on a third side of the body between the first and second sides, for receiving a first flexible retainer finger and a first guide post;

a second pair of retainer/guide slots formed on the support flange on a fourth side of the body opposite the third side for receiving a second flexible retainer finger and a second guide post;

a first divider post disposed between the first pair of retainer/guide slots and extending up from the support flange;

a second divider post disposed between the second pair of retainer/guide slots and extending up from the support flange;

an elongated support divider extending between said third and fourth sides and mounted on the support flange and having a pair of cavities formed respectively at the opposite ends receiving said first and second divider posts for retaining the divider in position, and further having a pair of support arms respectively on opposite sides thereof, at least one of said arms having a pair of semi-circular slots, said arms being respectively for supporting the inner edge of an access hatch and/or the inner edge of a carpet ring.

8. An access hatch for an underfloor device comprising:

a rectangular shaped plate having a top planar surface, one edge of the plate being an inner edge and an opposite edge being an outer edge and the edges therebetween being side edges;

a rib means extending around the periphery of the plate and comprised of inner, outer, and side rib sections respectively extending down from said inner, outer, and side edges;

first and second pairs of knock-outs in said plate, the knock-outs being formed by first and second pairs of inner and outer, concentric, U-shaped undercuts on the bottom of said plate, the ends of the legs of the U of each undercut terminating in said inner rib section, the cut-outs providing that the material of the plate within the confines of the cut-out can be broken away;

a main rib extending down from the bottom of said plate and extending between and parallel to said inner and outer rib sections and connected to said side rib sections and being closely adjacent the bend in said cut-outs;

a pair of cross ribs extending down from the bottom of said plate and connected to said outer rib section and to said main rib and being respectively aligned with said first and second pairs of undercuts;

a first pair of knock-out ribs extending down from the bottom of the plate and connected to said inner rib section and said main rib and being closely adjacent said inner undercut of the first pair;

a second pair of knock-out ribs extending down from the bottom of the plate and connected to said inner rib section and said main rib and being closely adjacent said inner undercut of the second pair;

a pair of downwardly extending flexible keeper fingers respectively disposed on said side rib sections adjacent opposite ends of said inner edge, each finger having keeper means adjacent its lower end;

at least one downwardly extending locking finger disposed on said outer edge and having locking means adjacent its lower end; and a pair of shield posts respectively formed on said side rib sections between said main rib and said keeper fingers, each post being closely adjacent its finger and extending coextensively downwardly therewith.

* * * * *